United States Patent
Taira

[11] 3,744,881
[45] July 10, 1973

[54] MICROSCOPIC OBJECTIVE

[75] Inventor: Akio Taira, Tokyo, Japan

[73] Assignee: Olympus Optical Co., Ltd., Tokyo, Japan

[22] Filed: June 3, 1971

[21] Appl. No.: 149,465

[30] Foreign Application Priority Data
June 26, 1970 Japan.................... 45/55191
June 26, 1970 Japan.................... 45/55192
June 26, 1970 Japan.................... 45/55193

[52] U.S. Cl............ 350/218, 350/175 ML, 350/177, 350/227
[51] Int. Cl. ........................................ G02b 21/02
[58] Field of Search.................. 350/175 ML, 218, 350/227, 177

[56] References Cited
UNITED STATES PATENTS
3,503,675  3/1970  Muller ........................... 350/227 X
3,176,583  4/1965  Klein..................... 350/175 ML UX
3,507,554  4/1970  Benford ............................ 350/177
3,537,773  11/1970 Klein.............................. 350/177

*Primary Examiner*—John K. Corbin
*Attorney*—Kurt Kelman

[57] ABSTRACT

The microscopic objective having a low magnification includes three lens groups separated from each other by an air gap. The foremost first group includes two cemented lens elements of the positive power as a whole, and the second group includes a negative lens component while the third group includes two cemented lens elements of the positive power as a whole. The objective satisfies the following limitations:

$$0.4f < l_2 < 1.2f \qquad (1)$$

$$20 < |\nu_5 - \nu_6| < 50 \qquad (2)$$

$$15 < |\nu_1 - \nu_2| \qquad (3)$$

$$(0.1/f) < (n_1 - n_2/r_2) < (1/f) \qquad (4)$$

where:
$n_1$, $n_2$ and $\nu_1$, $\nu_2$ = refractive index and the Abbe number, respectively, of the respective lens element in the first group beginning at the object side,
$r_2$ = radius of curvature of the cemented surfaces of the lens elements in the first group,
$\nu_5$, $\nu_6$ = Abbe number of the respective lens element in the third group beginning at the objective side,
$l_2$ = air gap between the second group and the third group, and
$f$ = focal length of the entire system.

The objective provides a short working distance while various aberrations are well compensated for and the image surface is made flat.

3 Claims, 12 Drawing Figures

SPHERICAL ABERRATION

ASTIGMATISM

DISTORTION

INVENTOR
AKIO TAIRA
BY Kurt Kelman
AGENT

SPHERICAL ABERRATION

ASTIGMATISM

DISTORTION

SPHERICAL ABERRATION

ASTIGMATISM

DISTORTION

MICROSCOPIC OBJECTIVE

BACKGROUND OF THE INVENTION

The present invention relates to a low magnification microscopic objective having an appropriate working distance.

In a prior art microscopic objective having a magnifying power ranging about 1X and 4X, the working distance is necessarily great and, therefore, the stroke of the vertical movement of a stage of a microscope used with the objective must be made great in order to permit the microscope to be used with a high magnification objective having a very short working distance. When a low magnification objective is used in a microscope having a revolving nose-piece or a revolving objective changer together with a high magnification objective, the position of the stage in which the low magnification objective is focused is greatly spaced from the position of the stage in which the high magnification objective is focused, thereby making the manipulation of the microscope very troublesome and difficult.

In order to avoid the above disadvantages, an objective of a telescopic type has been utilized. The telescopic type objective comprises a front group of a negative lens component and a rear group of a positive lens component spaced a relatively great distance from the front group. Because of the arrangement of the lens components as described above, the overcorrection of the chromatic aberration occurs in the front group while undercorrection of the chromatic aberration takes place in the rear group, thus rendering the chromatic aberration of magnification to be a high magnification at the side of long waves lengths while the chromatic aberration tends to become a low magnification at the side of short wave lengths. In general, the chromatic aberration of magnification increases as the working distance is made shorter. To the contrary, the chromatic aberration of magnification of a high magnification objective has the inverse relationship to the above. Since the chromatic aberration of magnification of an objective can not be completely compensated for by the objective itself, the residual curvature of is in general compensated for by an eyepiece used with the objective. Therefore, unless the characteristics of the chromatic aberration of magnification of a low magnification objective are modified to be about the same tendency as those of a high magnification objective, the eyepiece can not be commonly used with the high magnification objective and the low magnification objective, thereby resulting in inconvenience in the operation of a microscope. Further, when a low magnification objective is modified to have characteristics of chromatic aberration of magnification like those of a high magnification objective, the distortion is greatly increased while the curvatureof field convex toward the object side increases.

On the other hand, a prior art microscopic objective having a magnification of about 10X and a flat image surface comprises a foremost first group including a meniscus lens component having a heavy concave surface toward the object side or a rear group including a lens component having a heavy concave surface. In the former case, the working distance is made very small, while, in the latter case, the spherical aberration of color is increased.

The present invention aims at avoiding the above described disadvantages.

SUMMARY OF THE INVENTION

An object of the present invention is to provide a novel and useful low magnification microscopic objective which avoids the above described disadvantages and in which the working distance is made very small so as to provide an appropriate working distance to be used in a microscope together with a high magnification objective and the chromatic aberration of magnification is well compensated for in about the same degree as that of a high magnification objective while the image surface is flat and the aberrations such as the distortion are sufficiently compensated for.

Another object of the present invention is to provide a novel and useful microscopic objective having a magnification of about 10X in which the working distance is made long so as to provide an appropriate working distance and the image surface is made flat, while various aberrations are sufficiently compensated for.

In accordance with a first feature of the present invention, the low magnification microscopic objective comprises a foremost first group consisting of a cemented positive lens component, a second group including a negative lens component, and a third group consisting of a cemented positive lens component, the objective satisfying the following limitations:

$$0.4f < l_2 < 1.2f \tag{1}$$

$$20 < |\nu_5 - \nu_6| < 50 \tag{2}$$

$$15 < |\nu_1 - \nu_2| \tag{3}$$

$$(0.1/f) < (n_1 - n_2/r_2) < (1/f) \tag{4}$$

where:

$n_1, n_2$ = refractive indices of the respective lens elements in the first group, $\nu_1, \nu_2$ = Abbe numbers of the respective lens elements in the first group, $r_2$ = radius of curvature of the cemented surfaces of the lens elements in the first group, $\nu_5, \nu_6$ = Abbe numbers of the respective lens elements in the third group, $l_2$ = air gap between the second group and the third group, and f = resultant focal length of the entire system.

The reasons for setting the above limitations are as follows.

$$0.4f < l_2 < 1.2f: \tag{1}$$

If the value $l_2$ is made less than the lower limit $0.4f$, the refractive power of each of the groups located at both sides of the air gap $l_2$ is made high, thereby increasing the chromatic aberration of magnification having the tendency in inverse relationship to that of a high magnification objective so that the chromatic aberration of magnification can not be compensated for, and, at the same time, the curvature of field and the coma are remarkably increased. On the other hand, if the value $l_2$ is made greater than the upper limit $1.2f$, the spherical aberration at the side of short wave length is made excessively large.

$$20 < |\nu_5 - \nu_6| < 50 \tag{2}$$

If the value $|\nu_5 - \nu_6|$ is made smaller than the lower limit 20, remarkable undercorrection of the axial chromatic aberration will take place when the above stated conditions for correction of the chromatic aberration of magnification are satisfied. And, if the value $|\nu_5 - \nu_6|$ exceeds the upper limit 50, remarkable overcorrection of the axial spherical aberration of color will take place at the side of short wave lengths thereby resulting in inappropriate compensation.

$$15 < |\nu_1 - \nu_2| \tag{3}$$

If the value $|\nu_1 - \nu_2|$ is made less than the lower limit 15, the above stated conditions for correction of the chromatic aberration of magnification can not be satisfied unless the value $|r_2|$ is made far smaller than the value satisfying the limitation (4). Further, the axial spherical aberration of color will be overcorrected. This is not desirable.

$$(0.1/f) < (n_1 - n_2/r_2) < (1/f) \tag{4}$$

If the refractive power of the cemented surfaces of the first group $(n_1 - n_2/r_2)$ is made smaller than the lower limit $(0.1/f)$, the distortion is made excessively great. On the other hand, if the value $(n_1 - n_2/r_2)$ is made greater than the upper limit $1/f$, excessive curvature of field as well as excessive astigmatism will take place.

The correction effected by the above conditions can not be obtained by other lens elements than those concerned.

It is found that better correction for the chromatic aberration, the curvature of field and the astigmatism is obtained when cemented negative lens elements are used as the second group or when the radius of curvatue of the cemented surfaces of the first group $r_2$ is made negative, i.e., $r_2 < 0$.

In accordance with a second feature of the present invention, the low magnification objective comprises a foremost first group consisting of a positive meniscus lens element having a relatively large focal length and having surfaces concave toward the objective side, a second group consisting of a negative meniscus lens component having the air contacting surfaces concave toward the object side, and a third group consisting of a cemented positive lens component, the objective satisfying the following limitations:

$$0.25f < l_2 < 0.6f \tag{5}$$

$$0.2f < d_1 + l_1 < 0.4f \tag{6}$$

$$2f < f_1 < 5f \tag{7}$$

$$0.25f < |r1| < 0.6f \tag{8}$$

where:
 $l_1$ = air gap between the first group and the second group,
 $l_2$ = air gap between the second group and the third group,
 $d_1$ = thickness of the lens element in the first group,
 $r_1$ = radius of curvature of the refracting surface of the lens element in the first group at the object side,
 $f_1$ = focal length of the lens element in the first group, and
 f = resultant focal length of the entire system.

The reasons for setting the above limitations are as follows:

$$0.25f < l_2 < 0.6f \tag{5}$$

If the value $l_2$ is made less than the lower limit $0.25f$, it is made impossible to compensate for the chromatic aberration of magnification. On the other hand, if the value $l_2$ is made greater than the upper limit $0.6f$, the spherical aberration of color is greatly increased.

$$0.2f < d_1 + l_1 < 0.4f \tag{6}$$

If the value $d_1 + l_1$ is made smaller than the lower limit $0.2f$, the distortion is excessively increased. On the other hand, if the value $d_1 + l_1$ is made greater than the upper limit $0.4f$, the spherical aberration of color and the annular zonal spherical aberration are remarkably increased.

$$2f < f_1 < 5f \tag{7}$$

If the value $f_1$ is made smaller than the lower limit $2f$, the annular zonal spherical aberration is remarkably increased. On the other hand, if the value $f1$ is made greater than the upper limit, substantial correction of the chromatic aberration of magnification must be effected by only the second group, thereby deteriorating greatly the spherical chromatic aberration and the coma.

$$0.25f < |r_1| < 0.6f \tag{8}$$

If the value $|r_1|$ is made smaller than the lower limit $0.25f$, the coma is deteriorated while the overcorrection of the spherical aberration of color will take place. On the other hand, if the value $|r_1|$ exceeds the upper limit $0.6f$, the coma is deteriorated in the sense opposite to that which occurs in the case when the value $|r_1|$ is made smaller than the lower limit. It is also not desirable.

It was found that better results were obtained in the present invention described above when a material having a high refractive index and a high dispersion was used as the material forming the lens element in the first group. It was also found that better results were obtained when a cemented negative lens component was used as the second group.

In accordance with a still further feature of the present invention, the objective is constructed in the form of Gauss type so as to obtain a magnification of about 10X and a flat image surface while the working distance is made long so as to provide an appropriate working distance and various aberrations are well compensated for. The objective comprises five groups constructed by seven lens elements. Details will be described later with reference to the embodiment thereof illustrated in the drawing.

DETAILED DESCRIPTION OF THE PREFERRED EMBODIMENTS

Figure 1:
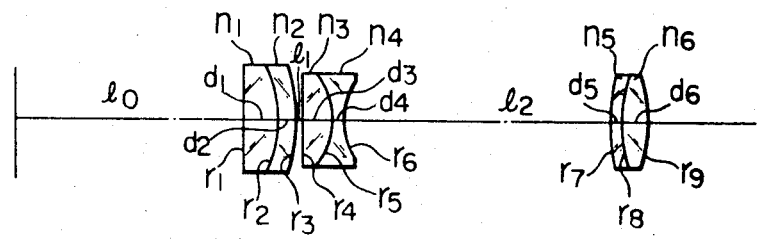
FIG. 1 is a longitudinal section view showing the first embodiment of the low magnification microscopic objective of the present invention.

Referring to FIG. 1 showing the first embodiment of the low magnification objective of the present invention, it comprises a first group consisting of two cemented lens elements of the positive power as a whole, a second group consisting of two cemented lens elements of the negative power as a whole, and a third group consisting of two cemented lens elements of the positive power as a whole. The objective satisfies the previously described limitations:

$$0.4f < l_2 < 1.2f \tag{1}$$

$$20 < |\nu_5 - \nu_6| < 50 \tag{2}$$

$$15 < |\nu_1 - \nu_2| \tag{3}$$

$$(0.1/f) < (n_1 - n_2/r_2) < (1/f) \tag{4}$$

Following Table 1 shows the numerical data of the embodiment of FIG. 1.

TABLE 1

| | | | | | | | |
|---|---|---|---|---|---|---|---|
| $r_1$ | 425.5 | $l_o$ | 20.2 | | | | |
| | | $d_1$ | 3.0 | $n_1$ | 1.5927 | $\nu_1$ | 35.4 |
| $r_2$ | −9.06 | $d_2$ | 1.4 | | | | |
| | | | | $n_2$ | 1.6700 | $\nu_2$ | 57.3 |
| $r_3$ | −15.2 | $l_1$ | 0.7 | | | | |
| $r_4$ | −38.0 | $d_3$ | 2.4 | | | | |
| $r_5$ | −6.56 | $d_4$ | 1.4 | $n_3$ | 1.6990 | $\nu_3$ | 30.1 |
| | | | | $n_4$ | 1.7292 | $\nu_4$ | 54.6 |
| $r_6$ | 6.56 | $l_2$ | 23.4 | | | | |
| $r_7$ | 31.55 | $d_5$ | 1.1 | | | | |
| | | | | $n_5$ | 1.7620 | $\nu_5$ | 40.2 |
| $r_8$ | 12.85 | $d_6$ | 2.3 | | | | |
| | | | | $n_6$ | 1.4866 | $\nu_6$ | 84.5 |
| $r_9$ | −13.65 | | | | | | |

Resultant Focal length $f = 31.9$ where:

$r_1, r_2, \ldots r_9$ = radius of curvature of the refracting surface of the respective lens element beginning at the object side as shown in FIG. 1, the radii of curvature of the cemented surfaces of adjacent two lens elements being commonly designated by the same numeral, $l_o$ = working distance, $l_1$ = air gap between the fist group and the second group, $l_2$ = air gap between the second group and the third group, $d_1, d_2, \ldots d_6$ = thickness of the respective lens element beginning at the object side, $n_1, n_2, \ldots n_6$ = refractive index of the respective lens element beginning at the object side, and $\nu_1, \nu_2, \ldots \nu_6$ = Abbe number of the respective lens element beginning at the object side.

Figure 2A:
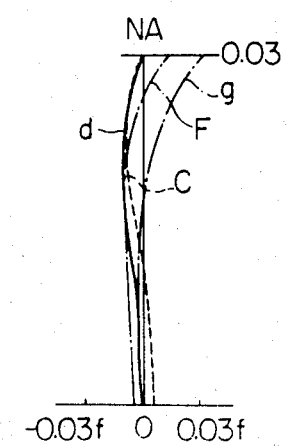
FIGS. 2a – 2c are diagrams showing various aberrations of the embodiment of FIG. 1, FIG. 2-a showing the spherical aberration, FIG. 2-b showing the astigmatism while FIG. 2-c shows the distortion.
Figure 2B:
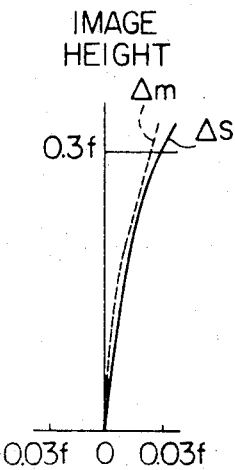
Figure 2C:
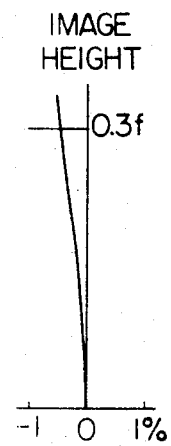

FIGS. 2-a, 2-b and 2-c show the spherical aberration, the astigmatism and the distortion of the objective of FIG. 1 constructed in accordance with the table 1. As seen from FIGS. 2a - 2c it is apparent that the objective of FIG. 1 has a sufficiently small working distance $l_o$ = 20.2 while the various aberrations are well compensated for.

Figure 3:
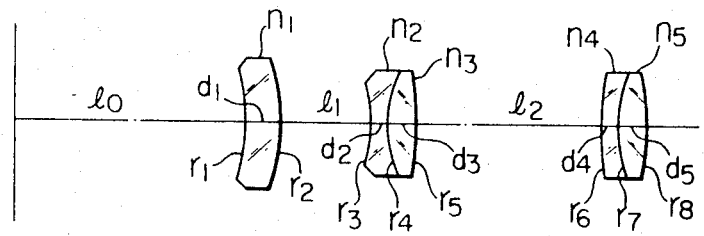
FIG. 3 is a longitudinal sectional view similar to FIG. 1 but showing the second embodiment of the low magnification microscopic objective of the present invention.

Referring to FIG. 3 showing the second embodiment of the low magnification microscopic objective of the present invention, it comprises a first group consisting of a positive meniscus lens element having a relatively long focal distance with the surfaces being concave toward the object side, a second group consisting of two cemented lens elements of the negative power as a whole having air contacting surfaces concave toward the object side, and a third group consisting of two cemented lens elements of the positivr power. The objective satisfies the previously described limitations:

$$0.25f < l_2 < 0.6f \tag{5}$$

$$0.2f < d_1 + l_1 < 0.4f \tag{6}$$

$$2f < f_1 < 5f \tag{7}$$

$$0.25f < |r_1| < 0.6f \tag{8}$$

The numerical data of the objective of FIG. 3 are given in the following Table 2.

TABLE 2

| | | | | | | | |
|---|---|---|---|---|---|---|---|
| $r_1$ | −14.8 | $l_o$ | 20.7 | | | | |
| | | $d_1$ | 2.9 | | | | |
| | | | | $n_1$ | 1.7408 | $\nu_1$ | 27.7 |
| $r_2$ | −14.0 | $l_1$ | 8.0 | | | | |
| $r_3$ | −10.49 | $d_2$ | 1.4 | | | | |
| | | | | $n_2$ | 1.6700 | $\nu_2$ | 57.3 |
| $r_4$ | 9.37 | $d_3$ | 2.5 | | | | |
| | | | | $n_3$ | 1.6034 | $\nu_3$ | 38.0 |

| | | | | | | | |
|---|---|---|---|---|---|---|---|
| $r_5$ | −21.56 | $l_2$ | 16.5 | | | | |
| $r_6$ | 35.61 | $d_4$ | 1.4 | $n_4$ | 1.6034 | $\nu_4$ | 38.0 |
| $r_7$ | 11.75 | $d_5$ | 2.5 | $n_5$ | 1.4866 | $\nu_5$ | 84.5 |
| $r_8$ | −18.11 | | | | | | |

Resultant Focal Length $f = 37.9$
Focal Length of First Group $f_1 = 135.2$
where:

$r_1, r_2 \ldots r_8$ = radius of curvature of the refracting surface of the respective lens element beginning at the object side, the radii of curvature of the cemented surface of adjacent two lens elements being designated commonly by the same numeral, $l_0$ = working distance, $l_1$ = air gap between the first group and the second group, $l_2$ = air gap between the second group and the third group, $d_1, d_2, \ldots d_5$ = thickness of the respective lens element beginning at the object side, $n_1, n_2, \ldots n_5$ = refractive index of the respective lens element beginning at the object side, and $\nu_1, \nu_2, \ldots \nu_5$ = Abbe number of the respective lens element beginning at the object side.

Figure 4A:
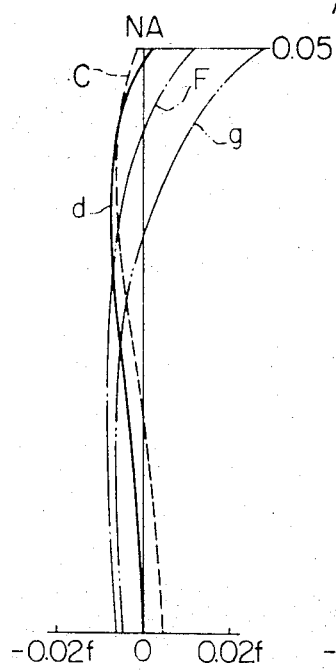
FIGS. 4a – 4c are diagrams similar to FIG. 2 but showing various aberrations of the embodiment of FIG. 3, FIG. 4-a showing the spherical aberration, FIG. 4-b showing the astigmatism while FIG. 4-c shows the distortion.
Figure 4B:
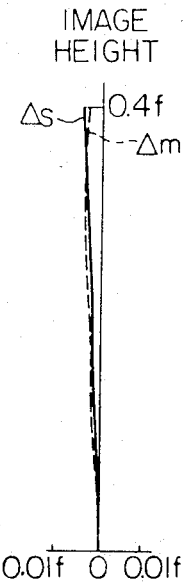
Figure 4C:
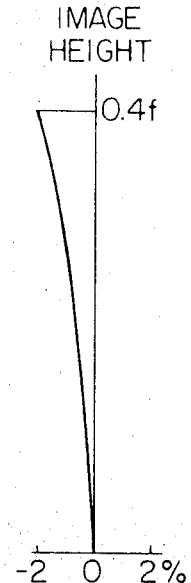

FIGS. 4-a, 4-b and 4-c show the spherical aberration, the astigmatism and the distortion of the objective of FIG. 3. As is apparent from FIGS. 4a – 4c the objective of FIG. 3 has a very short working distance $l_0 = 20.7$ while the various aberrations are well compensated for.

Figure 5:
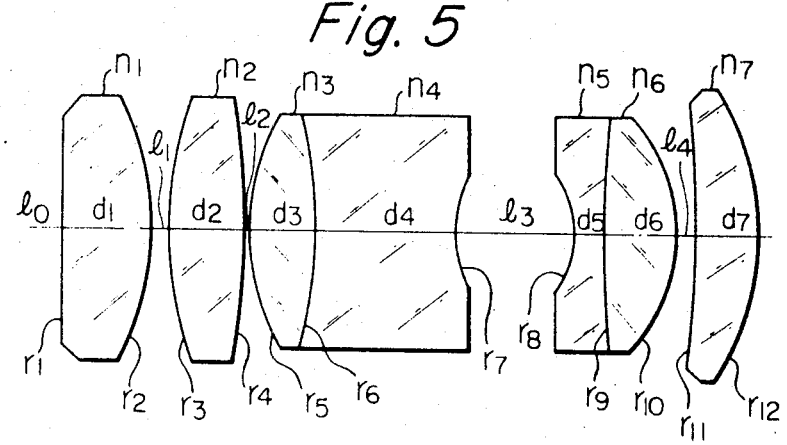
FIG. 5 is a longitudinal sectional view showing the third embodiment of the microscopic objective of the present invention.

FIG. 5 shows a third embodiment of the microscopic objective of the magnification of about 10X constructed in accordance with the present invention. The objective of FIG. 5 is of the Gauss type and comprises five groups consisting of seven lens elements, the first group, the second group and the fifth group consisting of a single lens element, respectively, while the third group and the fourth group consist of two cemented lens elements, respectively. The numerical data of the objective of FIG. 5 are given in the following Table 3.

TABLE 3

| | | | | | | | |
|---|---|---|---|---|---|---|---|
| | | $l_0$ | 7.31 | | | | |
| $r_1$ | −275.7 | $d_1$ | 3.2 | $n_1$ | 1.5638 | $\nu_1$ | 60.7 |
| $r_2$ | −10.56 | $l_1$ | 0.6 | | | | |
| $r_3$ | 14.32 | $d_2$ | 2.7 | $n_2$ | 1.5687 | $\nu_2$ | 63.1 |
| $r_4$ | −28.0 | $l_2$ | 0.2 | | | | |
| $r_5$ | 8.48 | $d_3$ | 2.3 | $n_3$ | 1.4866 | $\nu_3$ | 84.5 |
| $r_6$ | −16.72 | $d_4$ | 5.0 | $n_4$ | 1.6032 | $\nu_4$ | 42.3 |
| $r_7$ | 4.37 | $l_3$ | 4.3 | | | | |
| $r_8$ | −3.52 | $d_5$ | 1.0 | $n_5$ | 1.5955 | $\nu_5$ | 39.0 |
| $r_9$ | 36.91 | $d_6$ | 2.5 | $n_6$ | 1.4866 | $\nu_6$ | 84.5 |
| $r_{10}$ | −5.98 | $l_4$ | 0.7 | | | | |
| $r_{11}$ | −55.09 | $d_7$ | 2.2 | $n_7$ | 1.6400 | $\nu_7$ | 60.2 |
| $r_{12}$ | −8.77 | | | | | | |

Resultant Focal Length $f = 17.5$
where:

$r_1, r_2, \ldots r_{12}$ = radius of curvature of the refracting surface of the respective lens element beginning at the object side, the radii of curvature of the cemented surfaces of adjacent two lens elements being designated by the same numeral, $l_0$ = working distance, $l_1$ = air gap between the first group and the second group, $l_2$ = air gap between the second group and the third group, $l_3$ = air gap between the third group and the fourth group, $l_4$ = air gap between the fourth group and the fifth group, $d_1, d_2, \ldots d_{17}$ = thickness of the respective lens element beginning at the object side, $n_1, n_2, \ldots n_7$ = refractive index of the respective lens element beginning at the object side, and $\nu_1, \nu_2, \ldots \nu_7$ = Abbe number of the respective lens element beginning at the object side.

Figure 6A:
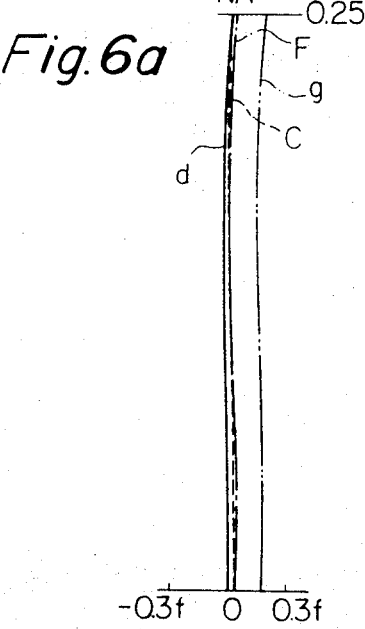
FIGS. 6a – 6c are diagrams similar to FIG. 2 but showing various aberrations of the embodiment of FIG. 5, FIG. 6-a showing the spherical aberration, FIG. 6-b showing the astigmatism while FIG. 6-c shows the distortion.
Figure 6B:
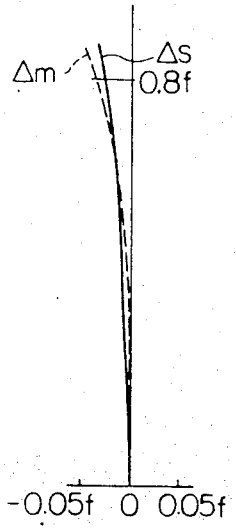
Figure 6C:
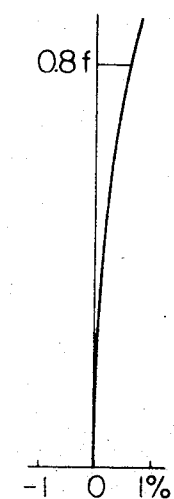

As seen from the Table 3, the working distance of the objective of FIG. 5 is made sufficiently long such as $l_0 = 7.31$ which is about 40 percent of the focal length $f = 17.5$ so that the objective can be used conveniently. FIGS. 6-a, 6-b and 6-c show the spherical aberration, the astigmatism and the distortion of the objective of FIG. 5. As is apparent from FIGS. 6a – 6c, the aberrations of the objective of FIG. 5 are sufficiently compensated for to provide a superior performance.

I claim:

1. In a microscopic objective including a first, a second and a third group separated from each other by an air gap, the improvement wherein said first group includes two cemented lens elements of positive power as a whole and said second group includes a negative lens component while said third group includes two cemented lens elements of positive power as a whole, said objective satisfying the following limitations:

$$0.4f < l_2 < 1.2f \tag{1}$$

$$20 < |\nu_5 - \nu_6| < 50 \tag{2}$$

$$15 < |\nu_1 - \nu_2| \tag{3}$$

$$(0.1/f) < (n_1 - n_2/r_2) < (1/f) \tag{4}$$

Where:

$n_1, n_2$ = refractive index of the respective lens elements in the first group beginning at the objective side, $\nu_1, \nu_2$ = Abbe number of the respective lens elements in the first group beginning at the object side, $r_2$ = radii of curvature of the cemented surfaces of the two lens elements in the first group, $\nu_5, \nu_6$ = Abbe number of the respective lens element in the third group beginning at the object side, $l_2$ = air gap between the second group, and the third group, and $f$ = resultant focal length of the entire system, and also satisfying the following numerical data:

| | | | | | | | |
|---|---|---|---|---|---|---|---|
| | | $l_0$ | 20.2 | | | | |
| $r_1$ | 425.5 | $d_1$ | 3.0 | $n_1$ | 1.5927 | $\nu_1$ | 35.4 |
| $r_2$ | −9.06 | $d_2$ | 1.4 | $n_2$ | 1.6700 | $\nu_2$ | 57.3 |
| $r_3$ | −15.2 | $l_1$ | 0.7 | | | | |
| $r_4$ | −38.0 | $d_3$ | 2.4 | $n_3$ | 1.6990 | $\nu_3$ | 30.1 |
| $r_5$ | −6.56 | $d_4$ | 1.4 | $n_4$ | 1.7292 | $\nu_4$ | 54.6 |
| $r_6$ | 6.56 | $l_2$ | 23.4 | | | | |
| $r_7$ | 31.55 | $d_5$ | 1.1 | $n_5$ | 1.7620 | $\nu_5$ | 40.2 |
| $r_8$ | 12.85 | $d_6$ | 2.3 | $n_6$ | 1.4866 | $\nu_6$ | 84.5 |
| $r_9$ | −13.65 | | | | | | |

Resultant Focal Length $f = 31.9$
where:

$r_1, r_2 \ldots r_9$ = radius of curvature of the refracting surface of the respective lens element beginning at the object side as shown in FIG. 1, the radii of curvature of the cemented surfaces of adjacent two lens elements being commonly designated by the same numeral, $l_0$ = working distance, $l_1$ = air gap between the first group and the second group, $l_2$ = air gap between the second group and the third group, $d_1, d_2, \ldots d_6$ = thickness of the respective lens element beginning at the object side, $n_1, n_2, \ldots n_6$ = refractive index of the respective lens element beginning at the object side, and $\nu_1, \nu_2, \ldots \nu_6$ = Abbe number of the respective lens element beginning at the object side.

2. In a microscopic objective including a first, a second and a third group separated from each other by an air gap, the improvement wherein said first group includes a positive meniscus lens element having a relatively large focal length < the refracting surfaces thereof being concave toward the object side and said second group includes two cemented meniscus lens elements of the negative power as a whole with the air contacting surfaces thereof being concave toward the object side while said third group includes two cemented lens elements of the positive power as a whole, said objective satisfying the following limitations:

$$0.25f < l_1 < 0.6f \quad (5)$$

$$0.2f < d_1 + l_1 < 0.4f \quad (6)$$

$$2f < f_1 < 5f \quad (7)$$

$$0.25f < |r_1| < 0.6f \quad (8)$$

where:

$l_1$ = air gap between the first group and the second group, $l_2$ = air gap between the second group and the third group, $d_1$ = thickness of the lens element of the first group, $r_1$ = radius of curvature of the refracting surface of the lens element of the first group facing to the object $f_1$ = focal length of the lens element of the first group, and $f$ = resultant focal length of the entire system, and also satisfying the following numerical data:

| | | $l_0$ | 20.7 | | | | |
|---|---|---|---|---|---|---|---|
| $r_1$ | −14.8 | $d_1$ | 2.9 | | | | |
| | | | | $n_1$ | 1.7408 | $\nu_1$ | 27.7 |
| $r_2$ | −14.0 | $l_1$ | 8.0 | | | | |
| $r_3$ | −10.49 | $d_2$ | 1.4 | | | | |
| | | | | $n_2$ | 1.6700 | $\nu_2$ | 57.3 |
| $r_4$ | 9.37 | $d_3$ | 2.5 | | | | |
| | | | | $n_3$ | 1.6034 | $\nu_3$ | 38.0 |
| $r_5$ | −21.56 | $l_2$ | 16.5 | | | | |
| $r_6$ | 35.61 | $d_4$ | 1.4 | | | | |
| | | | | $n_4$ | 1.6034 | $\nu_4$ | 38.0 |
| $r_7$ | 11.75 | $d_5$ | 2.5 | | | | |
| | | | | $n_5$ | 1.4866 | $\nu_5$ | 84.5 |
| $r_8$ | −18.11 | | | | | | |

Resultant Focal Length $f$ = 37.9

Focal Length of First Group $f_1$ = 135.2 where:

$r_1, r_2, \ldots r_8$ = radius of curvature of the refracting surface of the respective lens element beginning at the object side, the radii of curvature of the cemented surface of adjacent two lens elements being designated commonly by the same numeral, $l_0$ = working distance, $l_1$ = air gap between the first group and the second group, $l_2$ = air gap between the second group and the third group, $d_1, d_2, \ldots d_5$ = thickness of the respective lens element beginning at the object side, $n_1, n_2, \ldots n_5$ = refractive index of the respective lens element beginning at the object side, and $\nu_1, \nu_2, \ldots \nu_5$ = Abbe number of the respective lens element beginning at the object side.

3. In a microscopic objective including a first, a second, a third, a fourth and a fifth group separated from each other by an air gap, said first to fifth groups, inclusive, consisting of seven lens elements, the improvement wherein said first, said second and said fifth group consisting of a single lens element, respectively, while said third and said fourth group consist of two cemented lens elements, respectively, said objective satisfying the following numerical data:

| | | $l_0$ | 7.31 | | | | |
|---|---|---|---|---|---|---|---|
| $r_1$ | −275.7 | $d_1$ | 3.2 | $n_1$ | 1.5638 | $\nu_1$ | 60.7 |
| $r_2$ | −10.56 | $l_1$ | 0.6 | | | | |
| $r_3$ | 14.32 | $d_2$ | 2.7 | $n_2$ | 1.5687 | $\nu_2$ | 63.1 |
| $r_4$ | −28.0 | $l_2$ | 0.2 | | | | |
| $r_5$ | 8.48 | $d_3$ | 2.3 | $n_3$ | 1.4866 | $\nu_3$ | 84.5 |
| $r_6$ | −16.72 | $d_4$ | 5.0 | $n_4$ | 1.6032 | $\nu_4$ | 42.3 |
| $r_7$ | 4.37 | $l_3$ | 4.3 | | | | |
| $r_8$ | −3.52 | $d_5$ | 1.0 | $n_5$ | 1.5955 | $\nu_5$ | 39.0 |
| $r_9$ | 36.91 | $d_6$ | 2.5 | $n_6$ | 1.4866 | $\nu_6$ | 84.5 |
| $r_{10}$ | −5.98 | $l_4$ | 0.7 | | | | |
| $r_{11}$ | −55.09 | $d_7$ | 2.2 | $n_7$ | 1.6400 | $\nu_7$ | 60.2 |
| $r_{12}$ | −8.77 | | | | | | |

Resultant Focal Length $f$ = 17.5 where:

$r_1, r_2, \ldots r_{12}$ = radius of curvature of the refracting surface of the respective lens element beginning at the object side, the radii of curvature of the cemented surfaces of adjacent two lens elements being designated by the same numeral, $l_0$ = working distance, $l_1$ = air gap between the first group and the second group, $l_2$ = air gap between the second group and the third group, $l_3$ = air gap between the third group and the fourth group, $l_4$ = air gap between the fourth group and the fifth group, $d_1, d_2, \ldots d_7$ = thickness of the respective lens element beginning at the object side, $n_1, n_2, \ldots n_7$ = refractive index of the respective lens element beginning at the object side, and $\nu_1, \nu_2, \ldots \nu_7$ = Abbe number of the respective lens element beginning at the object side.

* * * * *